(12) United States Patent
Du

(10) Patent No.: US 11,481,113 B1
(45) Date of Patent: Oct. 25, 2022

(54) SHORTCUT GENERATION

(71) Applicant: International Business Machines Corporation, Armonk, NY (US)

(72) Inventor: Ke Du, Shaanxi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/306,112

(22) Filed: May 3, 2021

(51) Int. Cl.
*G06F 3/04883* (2022.01)
*G06F 3/041* (2006.01)
*G06F 3/04817* (2022.01)
*G06K 9/62* (2022.01)
*G06V 40/20* (2022.01)

(52) U.S. Cl.
CPC .......... *G06F 3/04883* (2013.01); *G06F 3/041* (2013.01); *G06F 3/04817* (2013.01); *G06K 9/6256* (2013.01); *G06V 40/20* (2022.01)

(58) Field of Classification Search
CPC ........ G01P 13/00; G01P 15/18; G06F 1/1626; G06F 1/1694; G06F 3/017; H04M 1/72403; H04M 1/72448; H04M 1/72469; H04M 1/72436; H04M 2250/12
See application file for complete search history.

(56) References Cited

U.S. PATENT DOCUMENTS

| 7,702,402 B2 * | 4/2010 | Tsujino | G01P 15/18 |
| | | | 345/184 |
| 9,239,673 B2 | 1/2016 | Shaffer et al. | |
| 10,379,639 B2 | 8/2019 | Charbiwala et al. | |
| 2020/0036827 A1 * | 1/2020 | Choi | H04M 1/724 |
| 2020/0081592 A1 * | 3/2020 | Lin | G06F 3/0485 |

FOREIGN PATENT DOCUMENTS

| CN | 104808936 A | 7/2015 |
| CN | 108415636 A | 8/2018 |
| CN | 110389704 A | 10/2019 |
| EP | 3121701 A1 | 1/2017 |

OTHER PUBLICATIONS

Authors et. al.: Disclosed Anonymously, "Methods to operate large-screen smart phone with single hand", IP.com No. IPCOM000248892D, Jan. 20, 2017.
Authors et. al.: Disclosed Anonymously, "A method to move device's untouchable area horizontally and vertically through hand swing", IP.com No. IPCOM000242321D,Jul. 7, 2015.
Mell, P. et al., "The NIST Definition of Cloud Computing", Recommendations of the National Institute of Standards and Technology, NIST Special Publication 800-145, 7 pages, Sep. 2011.

* cited by examiner

Primary Examiner — Nelson M Rosario
(74) Attorney, Agent, or Firm — Mark Bergner

(57) ABSTRACT

A computer-implemented method for shortcut generation obtains motion data of a terminal device held by a user. An operation of the user based on the motion data may be predicted. Moreover, a shortcut for the predicted operation may be provided.

17 Claims, 13 Drawing Sheets

SHORTCUT GENERATION

BACKGROUND

Disclosed herein is a system and method related to shortcut generation for a terminal or display device.

Terminal or display devices are widely used in modern people's daily lives. With the popularity of a variety of applications, people may use the terminal devices to browse information. For example, people may frequently perform information and page navigation operations, such as back, forward, close, open menu, and other operations on such devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an embodiment of the present disclosure, there is provided a computer-implemented method for shortcut generation for a terminal device. In this method, motion data of the terminal device held by a user may be obtained. An action of the user may be predicted based on motion data. Then, a shortcut may be provided for the predicted action.

According to another embodiment of the present invention, there is provided an apparatus for shortcut generation for a terminal device. The apparatus may comprise one or more processors, a memory coupled to at least one of the one or more processors, and a set of computer program instructions stored in the memory. The set of computer program instructions may be executed by at least one of one or more processors to perform the above method.

According to another embodiment of the present disclosure, there is provided a computer program product for shortcut generation for a terminal device. The computer program product may comprise a computer readable storage medium having program instructions embodied therewith. The program instructions executable by one or more processors causes the processor to perform the above method.

In addition to the example aspects and embodiments described above, further aspects and embodiments will become apparent by reference to the drawings and by study of the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
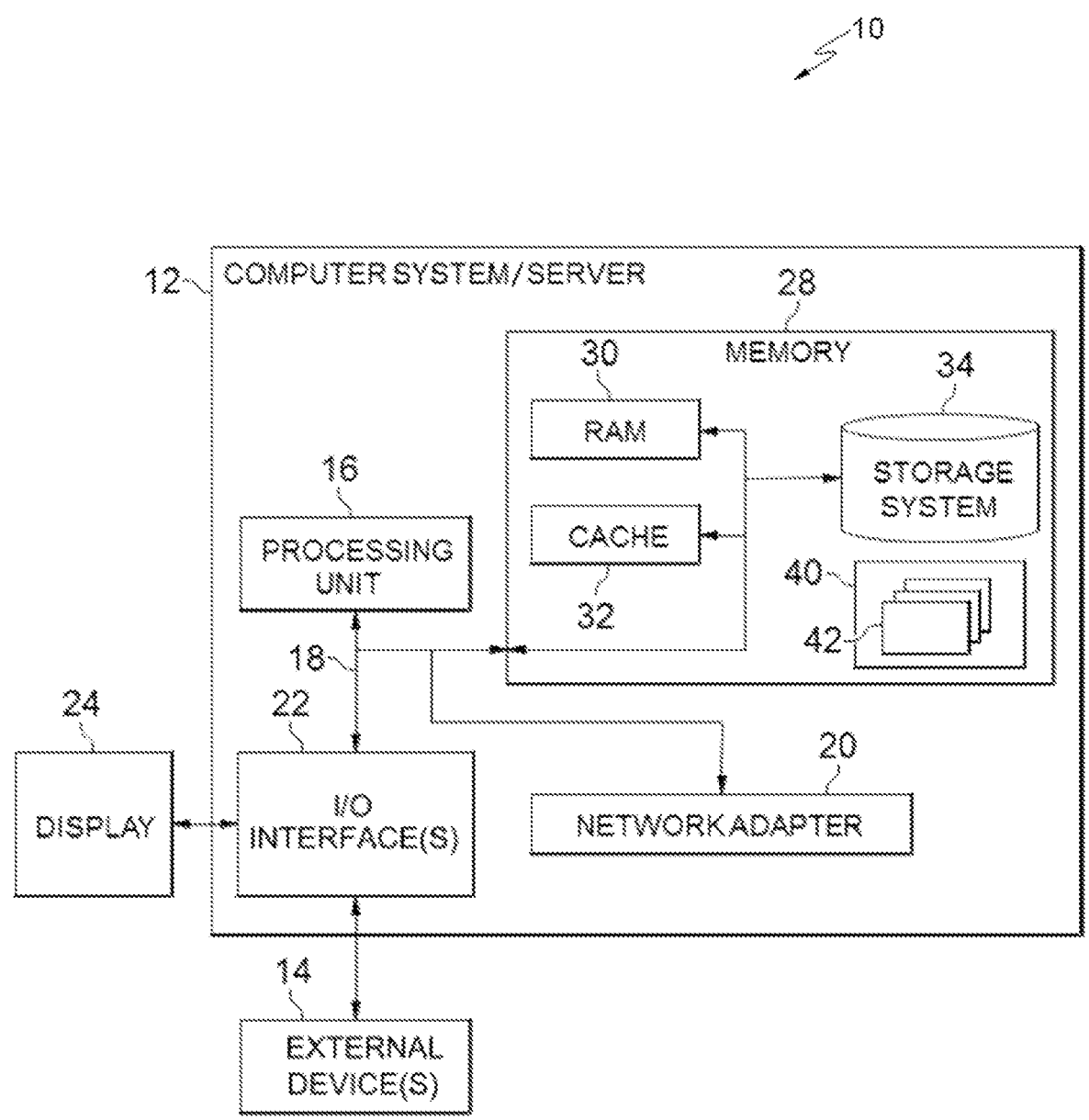
FIG. 1 depicts a cloud computing node according to an embodiment of the present disclosure.

Some embodiments will be described in more detail with reference to the accompanying drawings, in which the embodiments of the present disclosure have been illustrated. However, the present disclosure may be implemented in various manners, and thus should not be construed to be limited to the embodiments disclosed herein.

Cloud Computing

Although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
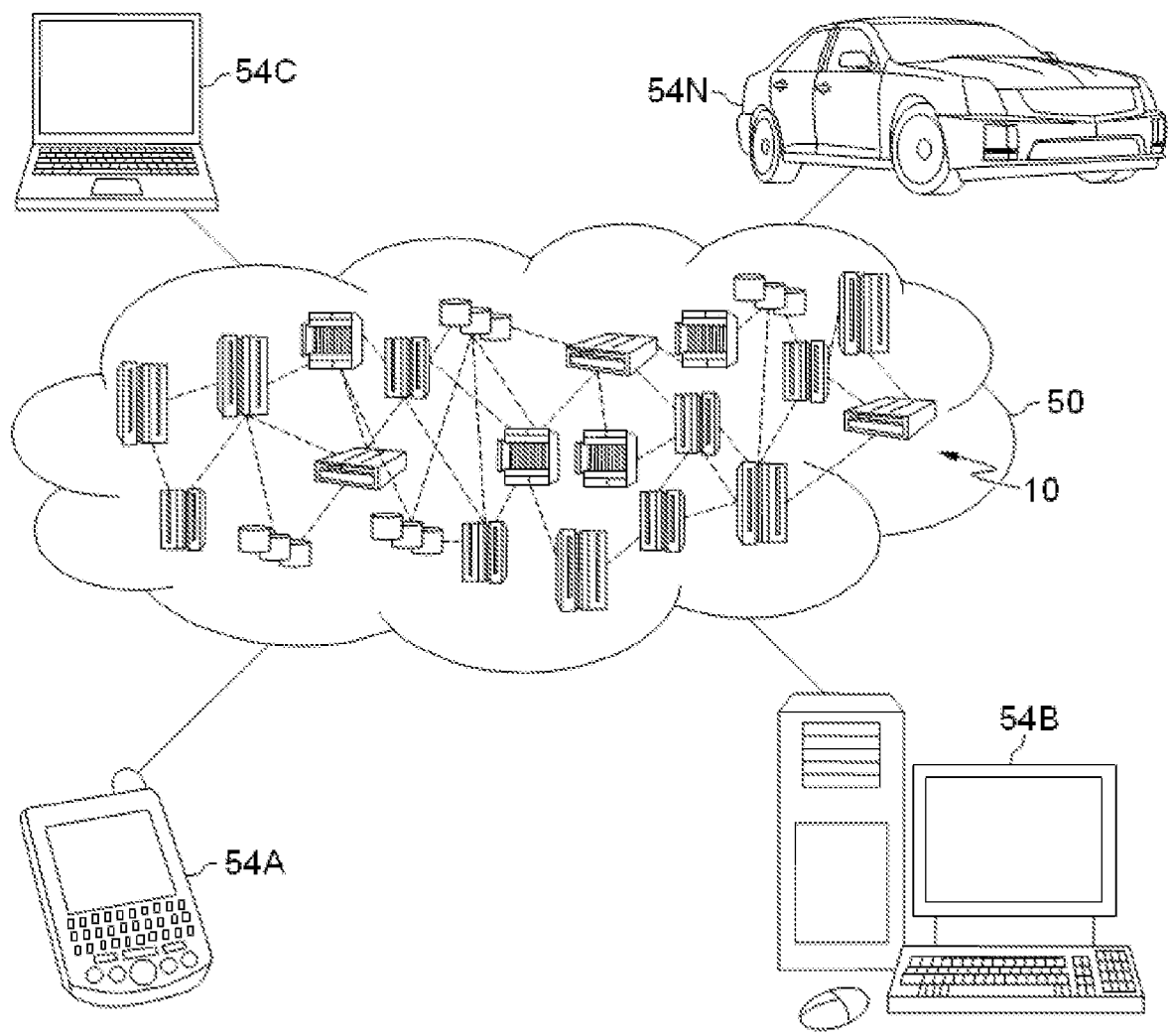
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
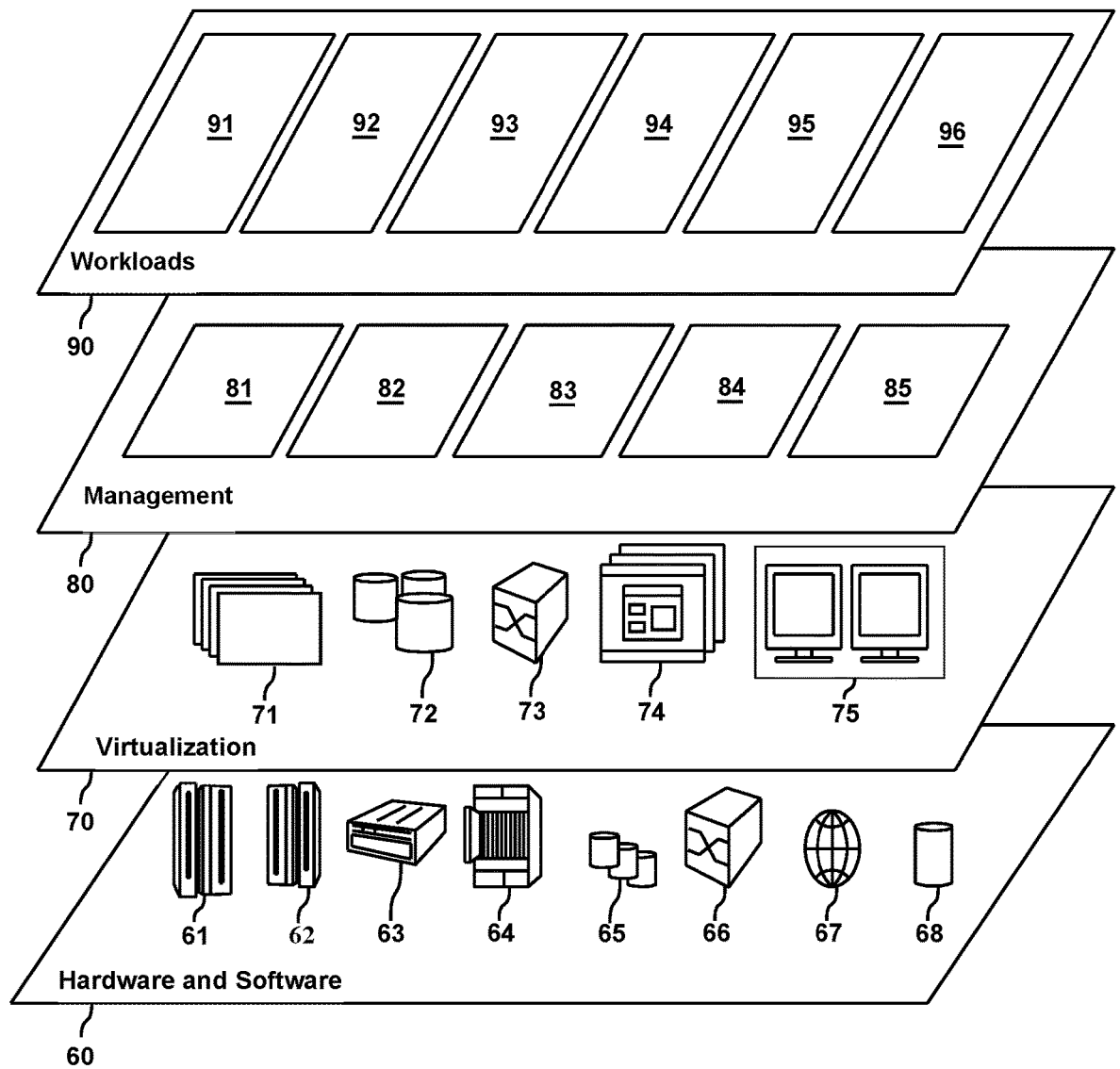
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing 96.

Shortcut Generation

As the resolution size of terminal devices increases, it may be very inconvenient for people to touch some places on the screen, such as upper corner areas. Moreover, higher resolution may mean that some buttons are too small or difficult to be clicked accurately. Navigation buttons, such as real and/or virtual navigation buttons, may be arranged on terminal devices in order to assist with some operations that may be very uncomfortable, non-ergonomic, and/or inconvenient for users to perform. The users may implement corresponding operations by way of the navigation buttons directly. However, due to a limited number of the navigation buttons, only a few types of operations may be achieved. Moreover, the navigation buttons may occupy a large portion of space on a screen of a terminal device or cover contents displayed on the screen.

To this end, embodiments of the present disclosure provide a method for shortcut generation on a terminal device, thereby making a user to perform operations conveniently and accurately. The method may be implemented to identify the user's behavior in advance by analyzing the terminal device's motion data in space, and provide the user with alternative operation methods before the user performs the uncomfortable operation.

The terminal device may comprise, but is not limited to, a smart phone, a tablet computer, a portable computer, a mobile device, and the like. In some embodiments, the terminal device may include one or more processors, a memory/storage, a touch display screen, one or more sensors, and the like. The terminal device may be implemented as a computing node 10 and may operate in a cloud computing environment 50.

In some embodiments, the touch display screen includes a touch panel and a display panel stacked with the touch panel. The display panel may be a light-emitting diode (LED) display panel, a liquid crystal display (LCD) panel, or the like. The touch panel may be, for example, a resistive touch panel, a capacitive inductive touch panel, or the like. Correspondingly, location and/or force of touches or touch gestures may be detected on the touch panel based on appropriate touching techniques known in the art.

The one or more sensors may include motion sensors, such as, acceleration sensors (e.g., accelerometer), gravitation sensors, rotation sensors (e.g., gyroscope), and the like. Moreover, the one or more sensors may further include proximity sensors (e.g., infrared sensors) that detect nearby objects, for example, a finger of a user.

A user may hold the terminal device and perform a variety of operations (i.e., touch operations), on the terminal device. Generally, the user behaves similarly when performing the same operations on the same terminal device. Some operations, especially uncomfortable operations, may cause shaking or rotating of the terminal device. Thus, a habitual operation may match a certain behavior of the user and a set of space motions of the terminal device. The space motions may be detected as motion data of the terminal device. Thus, the motion data may be analyzed to predict the corresponding operation, thereby generating a shortcut for the predicted operation.

Further, embodiments of the present disclosure provide a method for training a classification model to determine whether an operation is a comfortable operation or an uncomfortable operation. The classification model can then be used in the method for shortcut generation in the embodiments of the present disclosure. Embodiments will be described in detail below in conjunction with the figures.

Figure 4:
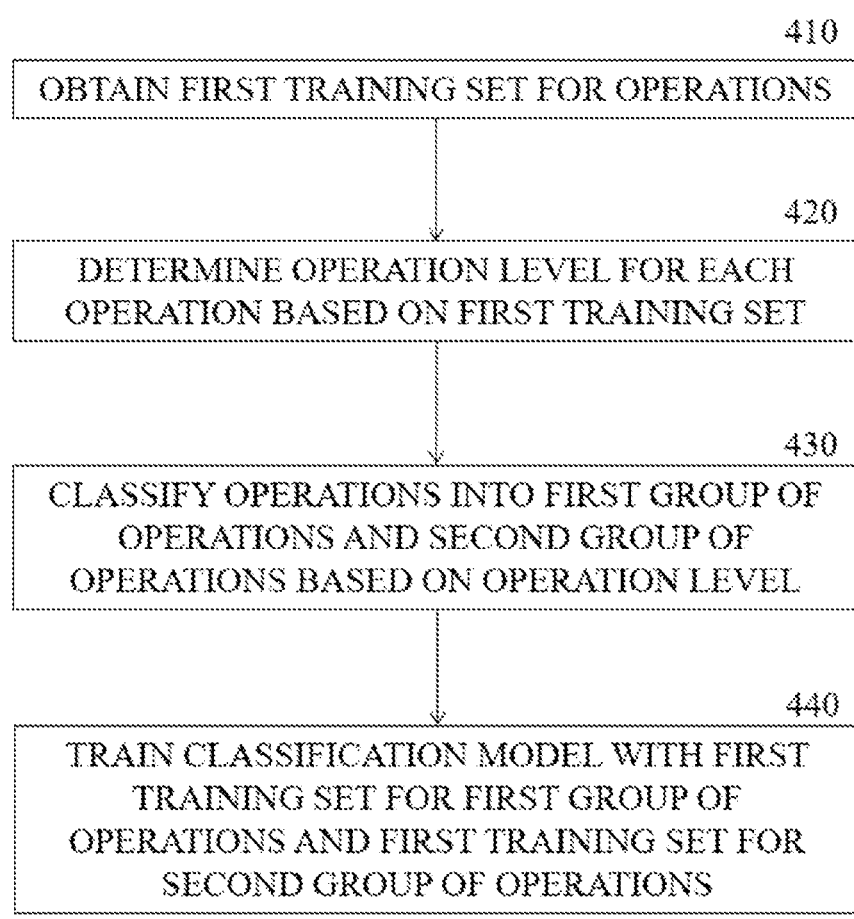
FIG. 4 depicts a schematic flowchart of a method for training a classification model according to an embodiment of the present disclosure.

FIG. 4 is a schematic flowchart of a method for training a classification model according to an embodiment of the present disclosure.

The processing of the classification model training according to embodiments of this disclosure could be implemented by a computing device, for example, the computer system/server 12 shown in FIG. 1. In some embodiments, the computing device may be arranged as a local engine in the terminal device or a cloud engine coupled to the terminal device in any appropriate manner. The processing described in this disclosure may be provided, e.g., by the application processing 96.

As shown in FIG. 4, at block 410, the computing device obtains a first training set for a plurality of operations executed on the terminal device. For example, the first training set may include, but is not be limited to, identifications of the respective operations and motion data of the terminal device associated with the respective operations.

In response to initiating an application, a user interface (or a page) may be presented on the terminal device. For example, the application may include a browser application, a media application, a messaging application, a game application, and/or the like. One or more function elements, such as buttons or links, may be displayed on the user interface. When a user performs an operation (for example, a touch event) on the function element, a corresponding function may be implemented. For example, when touching (for example, clicking or taping) the function element, a user may browse information or navigate between different user interfaces of the application.

In some embodiments, the computing device may collect touch information regarding a plurality of operations of a user using the terminal device within a time period. For example, the touch information may include touch time, touch position, and the like.

The computing device may further determine the identifications for the respective operations based on the touch information. For each of the operations, the identification includes a source identifier identifying the user interface on which the operation is performed, and a function name of the function element corresponding to the operation. The source identifier may be, for example, a page ID, an index, or the like. In some embodiments, the identifications for the respective operations may be stored in the memory of the computing device or stored in a remote database accessible by the computing device.

Moreover, as each of the plurality of operations may be executed one or more times during the time period, the computing device may also determine a count of executions (or an execution frequency) for the respective operations. The operations executed in higher execution frequencies may provide more useful information in the model training process than the operations executed in lower execution frequencies. In some embodiments, the count of executions (or an execution frequency) for the respective operations may be stored in the memory of the computing device or stored in a remote database accessible by the computing device.

In some embodiments, the computing device may obtain the motion data of the terminal device from the sensors, such as the accelerometer, the gyroscope, and the like. The accelerometer may detect linear acceleration along one or several axes, for example, magnitude and direction of gravity. For example, the motion data may comprise gravity data of x-axis, gravity data of y-axis, and gravity data of z-axis. The gyroscope may detect angular motion about one or several axes, for example, orientation and angular velocity. For example, the motion data may also comprise orientation data of x-axis, orientation data of y-axis, and orientation data of z-axis. In some embodiments, as the motion data are timeline based, the computing device may obtain the motion data constantly or at a regular time interval, for example, 10 ms. In a further embodiment, the obtained motion data may be stored in the memory of the computing device or stored in a remote database accessible by the computing device.

Further, the computing device may determine, for each of the plurality of operations, a motion duration based on the obtained motion data. In some embodiments, if the operation is executed multiple times, the computing device may determine an average motion duration for the corresponding operation, based on the motion data. In a further embodiment, the motion durations (or the average motion durations) for the respective operations may be stored in the memory of the computing device or stored in a remote database accessible by the computing device.

In some embodiments, the computing device may further calculate, for each of the plurality of operations, a shaking degree of the terminal device during the associated motion duration based on the motion data. For example, the shaking degree may be calculated based on magnitudes of the gravity data along the axes, magnitudes of the orientation data about the axes, and/or the like. In some embodiments, if the operation is executed multiple times, the computing device may determine an average shaking degree for the corresponding operation, based on the motion data.

As an example, the shaking degree may be calculated as shown in Equation 1:

$$\text{Shaking degree} = \Sigma \sqrt{x^2 + y^2 + z^2} \quad \text{(Equation 1)}$$

wherein:

x represents magnitude values of gravity data along x axis, y represents magnitude values of gravity data along y axis, and z represents magnitude values of gravity data along z axis.

Moreover, the shaking degrees (or the average shaking degrees) of the terminal device associated with the respective operations may be stored in the memory of the computing device or stored in a remote database accessible by the computing device.

Figure 5:
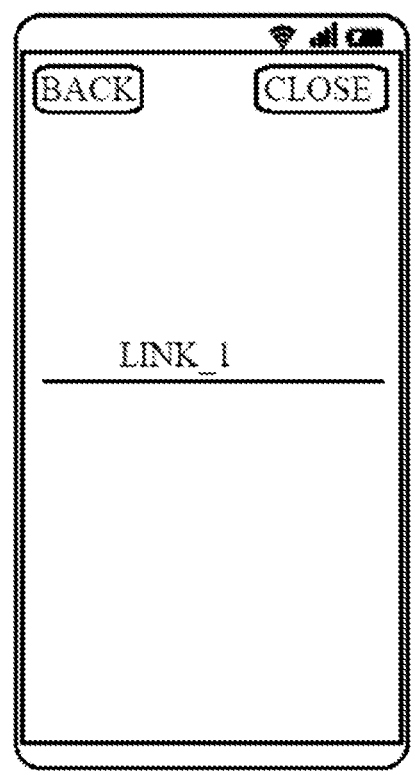
FIG. 5 depicts a diagram of an example page displayed on a screen of a terminal device according to an embodiment of the present disclosure.

FIG. 5 schematically shows a diagram of an example page displayed on a screen of a terminal device. The page may be identified with a page ID (which may also be referred to herein as a View). In this page, a button with a function name Back is presented at left top corner. A button with a function name Close is presented at right top corner. A link with a function name Link_1 is presented at middle area of the screen.

Figure 6A:
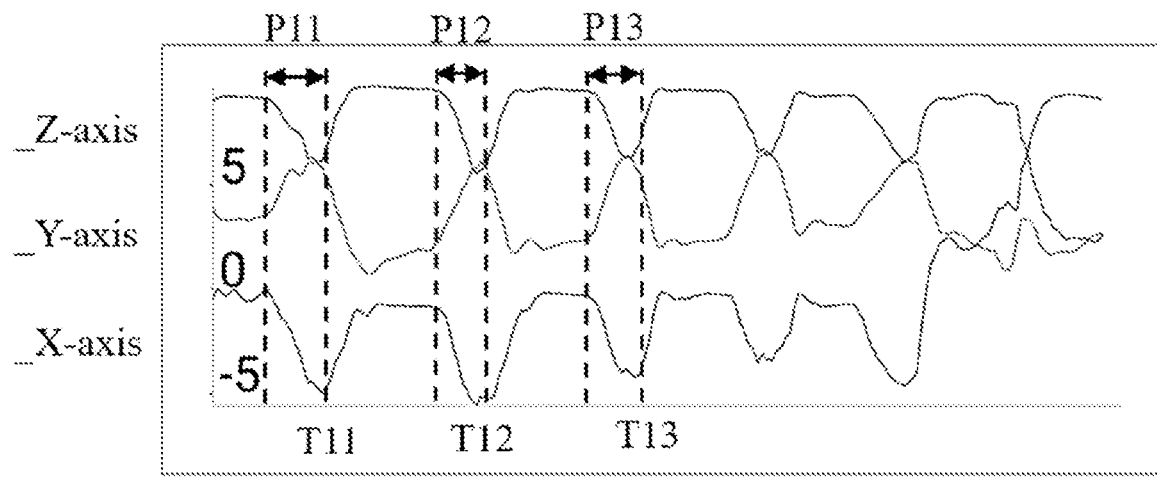
FIG. 6A depicts a graph illustrating gravity data of the terminal device in x, y, z axes over a time period according to an embodiment of the present disclosure.

FIG. 6A depicts a graph illustrating gravity data of the terminal device in the x, y, z axes over a time period. During this time period, the user touches the Back button shown in FIG. 5 multiple times. Based on the touching techniques, the computing device may determine that the touch operations (referred to herein as Back operations) associated with the Back button in page View are executed at timing T11, T12, and T13, respectively.

In some embodiments, the computing device may determine the respective motion durations of the Back operations based on the magnitude changes of the gravity data. As shown in FIG. 6A, a motion duration P11 of the Back operation at timing T11, a motion duration P12 of the Back operation at timing T12, and a motion duration P13 of the Back operation at timing T13 may be determined. Then, the computing device may further calculate an average motion duration of the motion durations P11, P12 and P13 for the Back operations.

Moreover, the computing device may determine the respective shaking degrees of the terminal device associated with the Back operations based on the gravity data during the motion durations P11, P12 and P13, respectively. Then, the computing device may further calculate an average shaking degree of the terminal device for the Back operations based on the respective shaking degrees of the terminal device during the motion durations P11, P12 and P13.

Figure 6B:
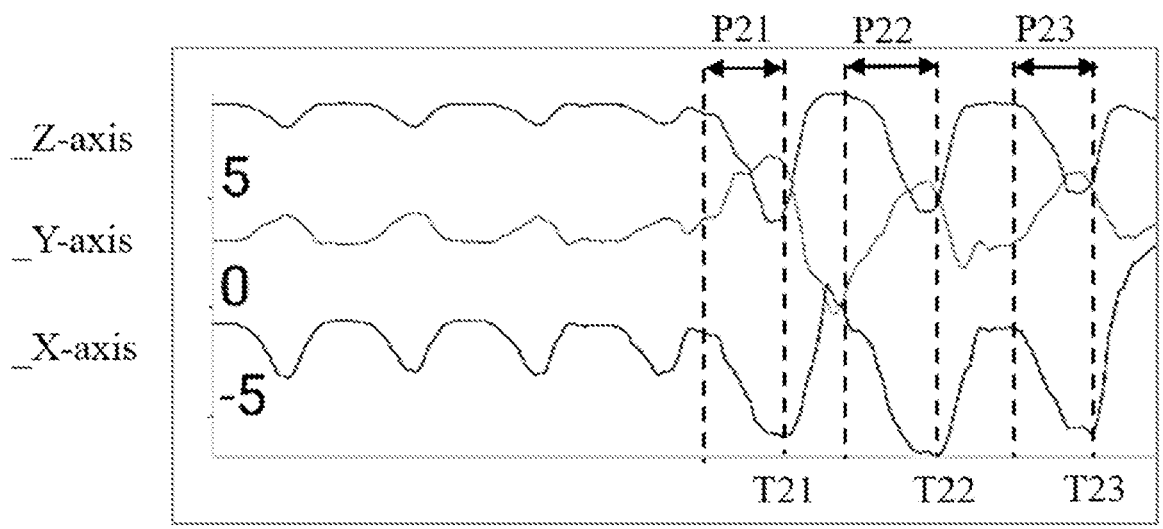
FIG. 6B depicts a graph illustrating gravity data of the terminal device in x, y, z axes over a time period according to an embodiment of the present disclosure.

FIG. 6B depicts a graph illustrating gravity data of the terminal device in the x, y, z axes over a time period. During this time period, the user touches the Close button shown in FIG. 5 multiple times. In the FIG. 6B, the computing device may determine that the touch operations (referred to herein as Close operations) associated with the Close button in page View are executed at timing T21, T22, and T23, respectively.

In some embodiments, the computing device may determine a motion duration P21 of the Close operation at timing T21, a motion duration P22 of the Close operation at timing T22, and a motion duration P23 of the Close operation at timing T23. Then, the computing device may further calculate an average motion duration of the motion durations P21, P22 and P23 for the Close operations.

Moreover, the computing device may determine the respective shaking degrees of the terminal device associated with the Close operations based on the gravity data during the motion durations P21, P22 and P23, respectively. Then, the computing device may further calculate an average shaking degree of the terminal device for the Close operations based on the respective shaking degrees of the terminal device during the motion durations P21, P22 and P23.

Figure 6C:
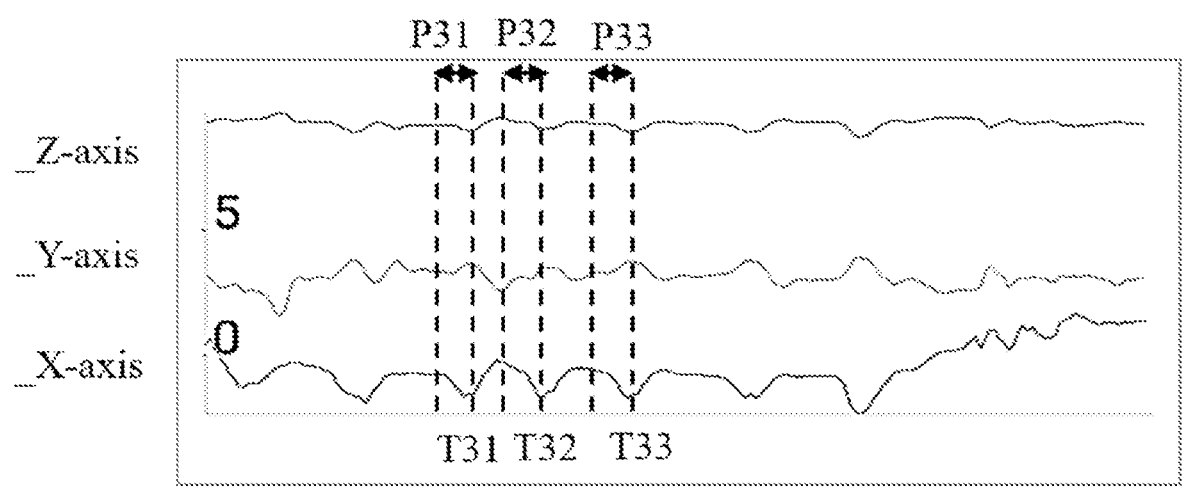
FIG. 6C depicts a graph illustrating gravity data of the terminal device in x, y, z axes over a time period according to an embodiment of the present disclosure.

FIG. 6C depicts a graph illustrating gravity data of the terminal device in the x, y, z axes over a time period. During this time period, the user touches the Link_1 link shown in FIG. 5 multiple times. In the FIG. 6C, the computing device may determine that the touch operations (referred to Link_1 operations) associated with the Link_1 link in page View are executed at timing T31, T32, and T33, respectively.

In some embodiments, the computing device may determine a motion duration P31 of the Link_1 operation at timing T31, a motion duration P32 of the Link_1 operation at timing T32, and a motion duration P33 of the Link_1 operation at timing T33. Then, the computing device may further calculate an average motion duration of the motion durations P31, P32 and P33 for the Link_1 operations.

Moreover, the computing device may determine the respective shaking degrees of the terminal device associated with the Link_1 operations based on the gravity data during the motion durations P31, P32 and P33, respectively. Then, the computing device may further calculate an average shaking degree of the terminal device for the Link_1 operations based on the respective shaking degrees of the terminal device during the motion durations P31, P32 and P33.

From the figures, the magnitude changes of the gravity data associated with the Back operation and the Close operation are significantly larger than the magnitude changes of the gravity data associated with the Link_1 operation. That is, the average shaking degree of the Back operation and the average shaking degree of the Close operation are higher than the shaking degree of the Link_1 operation. That indicates the terminal device shaking in a higher degree when performing the Back operation or Close operation than performing the Link_1 operation. Thus, this suggests that it is more inconvenient for the user to perform the Back operation and the Close operation than the Link_1 operation.

Moreover, the average motion duration of the Back operation and the average motion duration of the Close operation are much longer than the average motion duration of the Link_1 operation. Therefore, the user may need more time to perform the Back operation and the Close operation than the Link_1 operation, which may further cause the Back operation and the Close operation to be more inconvenient to perform.

Moreover, the computing device may also determine habitual sequences of operations. For example, the computing device may determine that a user always perform a first operation following by a second operation. Such operation sequence can also be included in the first training set.

In some embodiments, some or all of the information and data obtained by the computing device described above may be stored as the first training set in the memory of the computing device locally or in a remote database accessible by the computing device. For example, the first training set may include, but is not be limited to, the identifications (including the source identifier and function name), the touch information, the motion data (including the gravity data, the orientation data, the motion duration data, and/or the like), the shaking degrees of the terminal device, the count of executions, the habitual operation sequences, and/or the like.

Table 1 shows an example first training set for a plurality of operations.

TABLE 1

Example First Training Set

| Source identifier | Function name | Count of executions | Shaking degree |
|---|---|---|---|
| View | Back | 26 | 289.2 |
| View | Link_1 | 6 | 37.5 |
| View | Link_2 | 2 | 51.3 |
| View | Link_3 | 98 | 61.1 |
| MailList | Back | 12 | 269.5 |
| MailList | Reply | 8 | 165.1 |

From the Table 1, operations Back, Link_1, Link_2, and Link_3 are, respectively, executed on a page with a page I.D. View for a plurality of times. Specifically, the Back operation is executed 26 times with an average shaking degree 289.2. The Link_1 operation is executed 6 times with an average shaking degree 37.5. The Link_2 operation is executed only twice with an average shaking degree 51.3. The Link_3 operation is executed 98 times with an average shaking degree 61.1. Moreover, on a page with a page I.D. MailList, a Back operation is executed 12 times with an average shaking degree 269.5, and a Reply operation is executed 8 times with an average shaking degree 165.1. In some embodiments, a value related to the variance of parameters such as shaking degree or others may be determined and stored in addition to an average value. The variance may give some indication of how predictable certain parameters may be.

In FIG. 4, at block 420, the computing device determines an operation level for each of the plurality of operations based on the first training set.

In some embodiments, the computing device may determine the operation level based on the shaking degree of the terminal device, the count of executions, and/or the like. For example, the plurality of operations may be assigned into at least two operation levels. The operations assigned with higher operation levels may be more uncomfortable to perform than the operations assigned with lower operation levels. In an example, the operation with a higher shaking degree may be assigned with a higher operation level than the operation with a lower shaking degree. Moreover, the operation executed frequently may also be assigned with a higher operation level than the operation executed infrequently.

In some embodiments, the operation levels for the respective operations may be determined by way of a K-means algorithm. That is, the respective operations may be classified automatically to two or more operation levels based on the K-means algorithm. For example, the plurality of operations may be classified into three operation levels, such as, a first operation level 1, a second operation level 2, and a third operation level 3. Specifically, the first operation level 1 is higher than the second operation level 2, which is in turn higher than the third operation level 3.

Below shows an example format code for determining the operation levels with the K-means algorithm:
Source: {
    OperationName: [Count of Executions, Shake Degree, Operation level],
    . . .
}

Based on the example first training set in Table 1, the evaluation result may be derived as follows.
PAR: {
    View: {
        Back: [26, 289.2, 1]
        Link_1: [6, 37.5, 3]
        Link_2: [2, 51.3, 3]
        Link_3: [98, 61.1, 2]
        . . .
    },
    MailList: {
        Back: [12, 269.5, 1]
        Reply: [8, 165.1, 2]
    }
}

Therefore, the Back operation executed on the View page and the Back operation executed on the MailList page are both determined as the first operation level 1. The Link_3 operation executed on the View page and the reply operation executed on the MailList page are determined as the second operation level 2. The link_1 and Link_2 operation executed on the View page are determined as the third operation level 3. That is, the Back operation executed on the View page and the Back operation executed on the MailList page are relatively difficult to perform and may be referred to as uncomfortable operations.

It some other embodiments, the operation level may also be determined based on other data in the first training set, for example, the average motion durations, and/or other information extracted from the motion data.

Further, at block 430, the computing device classifies the plurality of operations into a first group of operations and a second group of operations based on the operation levels for the respective operations. Each operation in the first group of operations is a negative target with the operation level lower than the certain threshold. Each operation in the second group of operations is a positive target with the operation level equal to or higher than the certain threshold. For example, the certain threshold may be predefined based on actual needs.

A user may easily perform the operations having the lower operation levels (for example, the negative targets in the first group of operations). Therefore, an alternative method (for example, a shortcut) would be totally unnecessary for the negative targets. In contrast, the operations having higher operation levels (for example, the positive targets in the second group of operations) may be the uncomfortable operations, for which an alternative method would be very useful to improve operation experiences.

For the above example in Table 1, the certain threshold may be set as 2. Thus, if the operation level is 2 or 3, the corresponding operation may be determined as the negative targets in the first group. Otherwise, if the operation level is 1, the corresponding operation may be determined as the positive target in the second group.

Table 2 shows the classification results of the above example.

TABLE 2

Example Classification Results

| Source identifier | Function name | Count of executions | Shaking degree | Operation level | Group result |
|---|---|---|---|---|---|
| View | Back | 26 | 289.2 | 1 | 2 |
| View | Link_1 | 6 | 37.5 | 3 | 1 |
| View | Link_2 | 2 | 51.3 | 3 | 1 |
| View | Link_3 | 98 | 61.1 | 2 | 1 |
| MailList | Back | 12 | 269.5 | 1 | 2 |
| MailList | Reply | 8 | 165.1 | 2 | 1 |

Therefore, the first group of operations may comprise the Link_1 operation, the Link_2 operation, and the Link_3 operation on the View page, and the Reply operation on the MailList page. Moreover, the second group of operations may comprise the Back operation on the View page and the Back operation on the MailList page.

In some embodiments, the operation levels of the respective operations may be stored in the memory of the computing device or a remote database accessible by the computing device.

In addition, the computing device may further determine a duration threshold according to the motion durations and the operation levels of the plurality of operations. In some embodiments, the computing device may calculate an average motion duration of the first group of operations (i.e., an average motion duration of the negative targets) as a first duration. The first duration may indicate a time period that a user usually needs to perform an easy operation (also referred to as a comfortable operation). Moreover, the first duration may be stored in the memory of the computing device or a remote database accessible by the computing device, as the duration threshold.

In some embodiments, the duration threshold can then be used in the operation prediction in the processing of shortcut generation according to embodiments of the present disclosure. Embodiments will be described hereinafter. For example, the duration threshold may be used to indicate how much of the motion data is necessary for predicting an operation, and how long the prediction will start after the terminal device starts shaking.

Further, the computing device may also determine a percentage threshold according to the motion durations and the operation levels of the plurality of operations. In some embodiments, the computing device may calculate an average motion duration of the second group of operations (i.e., an average motion duration of the positive targets) as a second duration. The second duration may indicate a time period that a user usually needs to perform an uncomfortable operation, which is generally longer than the first duration. Then, the computing device may calculate a ratio of the first duration and the second duration, as the percentage threshold. Moreover, the percentage threshold may be stored in the memory of the computing device or a remote database accessible by the computing device.

In some embodiments, the percentage threshold can then be used in determining a position of the shortcut in the processing of shortcut generation according to embodiments of the present disclosure. Embodiments will be described hereinafter. For example, the percentage threshold may be used to indicate a position between a predetermined start position and a function position corresponding to the predicted operation (where the function element associated with the predicted operation places).

Then, the process continues to block 440. At block 440, the computing device trains the classification model with the first training set for the first group of operations and the first training set for the second group of operations.

In some embodiments, the computing device may train the classification model with the obtained first training set for the plurality of operations, the operation levels of the respective operations, and the classification results, and/or the like, based on machine learning. As the classification model may trained with a larger amount of data, the classification model may be implemented to be more robust.

The classification model, for example, may be a logistic regression model. Moreover, the classification model may also be implemented with any other appropriate model algorithms that implement such two-category predictions, such as support vector machines, neural networks, and the like.

In addition, the trained classification model may be input with data outside the first training set to predict whether the newly input data is associated with the positive target or the negative target.

Figure 7:
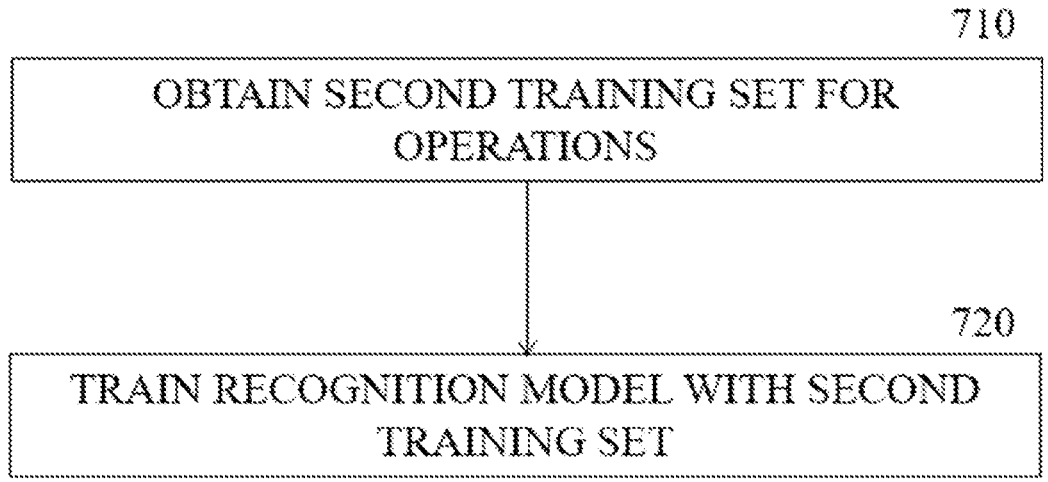
FIG. 7 depicts a schematic flowchart of a method for training a recognition model according to an embodiment of the present disclosure.

Moreover, embodiments of the present disclosure also provide a method for training a recognition model. FIG. 7 shows a schematic flowchart of a method for training a recognition model according to an embodiment of the present disclosure.

The processing of the recognition model training according to embodiments of this disclosure may be implemented by a computing device, for example, the computer system/server 12 shown in FIG. 1. In some embodiments, the computing device may be arranged as a local engine in the terminal device or a cloud engine coupled to the terminal device in any appropriate manner.

As shown in FIG. 7, at block 710, the computing device obtains a second training set for a plurality of operations executed on the terminal device. For example, the second training set may include, but is not be limited to, identifications of the respective operations and motion data of the terminal device associated with the respective operations.

In some embodiments, the computing device may implement the obtaining process at block 710 in a similar manner with the process at block 410 in FIG. 4. Thus, repeated descriptions may be omitted. In some examples, the second training set may be the same as the first training set. In other examples, the second training set may be different from the first training set.

For example, the second training set may include, but not be limited to, the identifications including the source identifier and function name, the touch information, the motion data (include the gravity data, the orientation data, the motion duration data, and/or the like), the shaking degrees of the terminal device, and the habitual operation sequences and/or the like.

At block 720, the computing device trains the recognition model with the second training set.

In some embodiments, the computing device may send the second training set to the recognition model, such that the recognition model may be trained based on machine learning. As the recognition model is trained with a large amount of data, the recognition model may be implemented to be more robust.

In some embodiments, the recognition model may be a neural network model, for example, an artificial neural network, a convolutional neural network, and a fully connected neural network. For example, the recognition model may be trained based on Keras. Moreover, the recognition model may also be implemented with any other appropriate model algorithms. The trained recognition model may be implemented to identify (or predict) an operation based on motion data of the terminal device. Therefore, the classification model and the recognition model may be trained, respectively, according to embodiments of the present disclosure. In further embodiments, the trained classification model and the trained recognition model can then be used in a method for shortcut generation according to embodiments of the present disclosure. Embodiments are described below.

Figure 8:
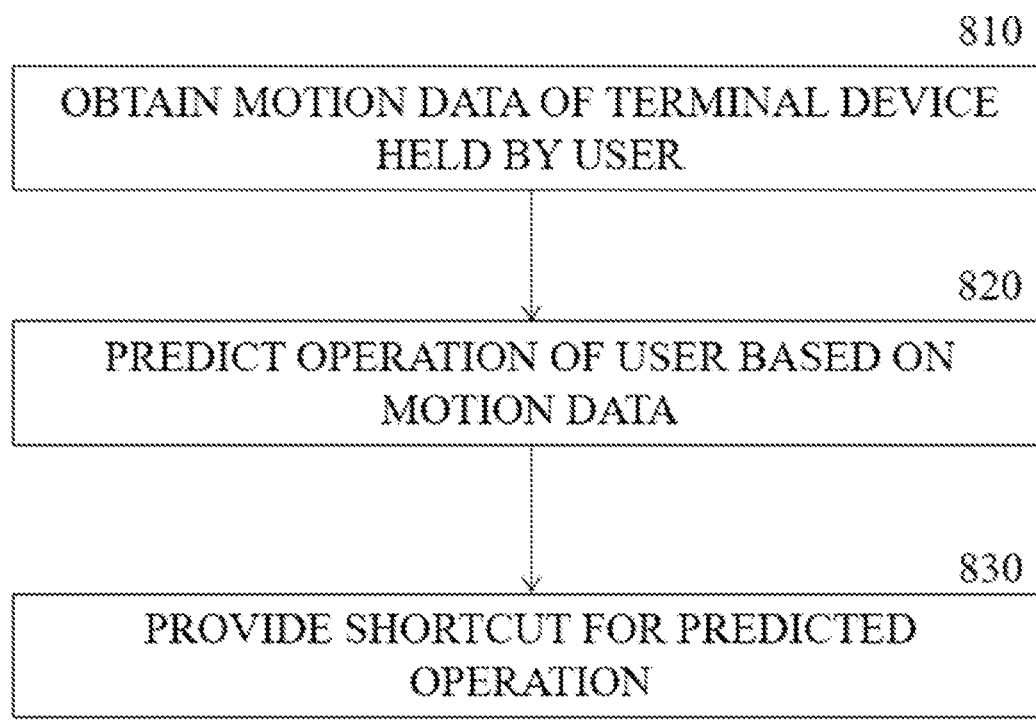
FIG. 8 depicts a schematic flowchart of a method for shortcut generation according to an embodiment of the present disclosure.

FIG. 8 shows a schematic flowchart of a method for shortcut generation according to an embodiment of the present disclosure. The processing of shortcut generation according to embodiments of the present disclosure may be implemented by a computing device, for example, the computer system/server 12 shown in FIG. 1.

At block 810, the computing device obtains motion data of a terminal device held by a user.

In some embodiments, the computing device may obtain the motion data of the terminal device from the sensors, such as the accelerometer, the gyroscope, and the like, in real time. For example, the motion data may comprise, but are not limited to, gravity data, orientation data, motion duration data, and the like. In some embodiments, the computing device may obtain the motion data constantly or at a regular time interval, for example, 10 ms. Moreover, the computing device may firstly determine a source identifier of a user interface currently displayed on a screen of the terminal device.

In some embodiments, the terminal device may be the same one as the terminal device used for model training (for example, which implements the method of training classification model according to FIG. 4, and the method of training recognition model according to FIG. 7). Thus, the classification model and the recognition model may be implemented in the shortcut generation method in FIG. 8, respectively.

In a further embodiment, the computing device may determine a duration threshold to indicate a time period for obtaining the motion data. For example, the computing device may retrieve the duration threshold from a memory/database (for example, the memory of the computing device implementing the method of FIG. 4 or the remote database accessible by the computing device). As described above, the duration threshold may be the first duration which is the average motion duration of the first group of operations (i.e., the average motion duration of negative targets).

Then, the computing device may start a timer when it determines the terminal device shaking or rotating while obtain the motion data. Then, the computing device may stop obtaining the motion data when the timer indicating the duration threshold expires. In this case, the motion data can only be obtained during the duration threshold after a starting time of the obtaining. Such motion data are enough for the following predicting operation.

At block 820, the computing device predicts an operation of the user based on the motion data.

In some embodiments, the computing device may firstly determine whether the operation currently executed on the terminal device is a positive target (for example, an uncomfortable operation) or a negative target (for example, a comfortable operation) based on the motion data by way of a classification model. The classification model may be, for example, a logical regression model. For example, the classification model may be trained based on the method in FIG. 4.

For example, the computing device may input the motion data obtained at block 810 into the classification model. In an embodiment, the classification model may map the obtained motion data into the first group of operations or the second group of operations. If the motion data may be mapped into the first group of operations, the classification model may predict the operation is a negative target (a comfortable operation). If the motion data may be mapped into the second group of operations, the classification model may predict the operation is a positive target (an uncomfortable operation).

Further, if the operation is a negative target, the obtained motion data may be omitted. In this case, the user can perform the operation directly, for example, easily touch the corresponding function element. There is no need to predict the operation or provide the shortcut. Thus, the computing device may stop performing the following steps, for example, predicting the operation and providing the shortcut.

On the other hand, if the operation is a positive target, the computing device may further predict the operation based on the motion data by way of a recognition model. The recognition model may be, for example, a neural network model. For example, the recognition model may be trained based on the method in FIG. 7.

In some embodiments, the computing device may input the motion data along with the source identifier into the recognition model. Thus, the recognition model can predict the operation based on the motion data and the source identifier.

In some embodiments, in a case that the motion data is only obtained during the duration threshold at block 810, the computing device may start the prediction as long as the duration threshold expires. That is, the computing device may perform the operation prediction in advance, without the need for the user to perform the whole operation.

Then, at block 830, the computing device provides a shortcut for the predicted operation. For example, the shortcut may be a shortcut button or a gesture icon. In some embodiments, the computing device may retrieve a default shortcut for the predicted operation and provide the default shortcut as the shortcut.

Moreover, the computing device may determine a position for providing the shortcut in the user interface of the terminal device. For example, the computing device may retrieve a percentage threshold from a memory/database (for example, the memory of the computing device implementing the method of FIG. 4 or the remote database accessible by the computing device).

As described above, the percentage threshold may be the ratio of the first duration (which is the average motion duration of the first group of operations) and the second duration (which is the average motion duration of the second group of operations). Then, the shortcut button may be placed at a position between a predetermined start position and a function position corresponding to the predicted operation based on the percentage threshold. The function position is a position of the function element associated with the predicted operation.

Figure 9:
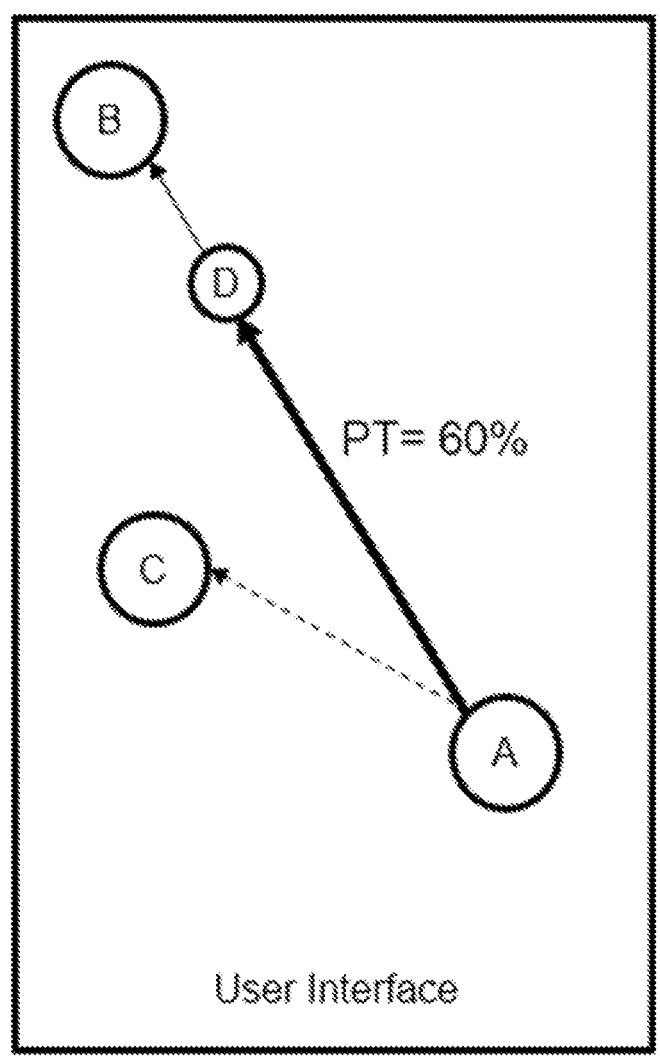
FIG. 9 depicts a diagram an example user interface displayed on a screen of a terminal device according to an embodiment of the present disclosure.

FIG. 9 shows an example diagram of a user interface on the terminal device. In FIG. 9, a predetermined start position A may be in a projection area of a thumb of the user holding the terminal device at first. For example, the predetermined start position A may be determined based on a proximity sensor of the terminal device.

Moreover, a function position B of a function element B and a function position C of a function element C may be presented on the user interface. If the computing device predicts that the user expects to touch the function element B, the computing device may determine function element B corresponds to a positive target and provide a shortcut button associated with the function element B at a position D in a route between the function position A and the function position B. For example, if the percentage threshold (PT) is determined as 60%, the shortcut may be placed at the position D, wherein the ratio of the distance between the function position A and the position D to the distance between the function position A and the function position B is set as 60%.

On the other hand, if the user expects to touch the function element C, the computing device may determine the corresponding operation is a negative target. Thus, there is no need to provide a further shortcut, and the user may easily touch the function element C.

Figure 10:
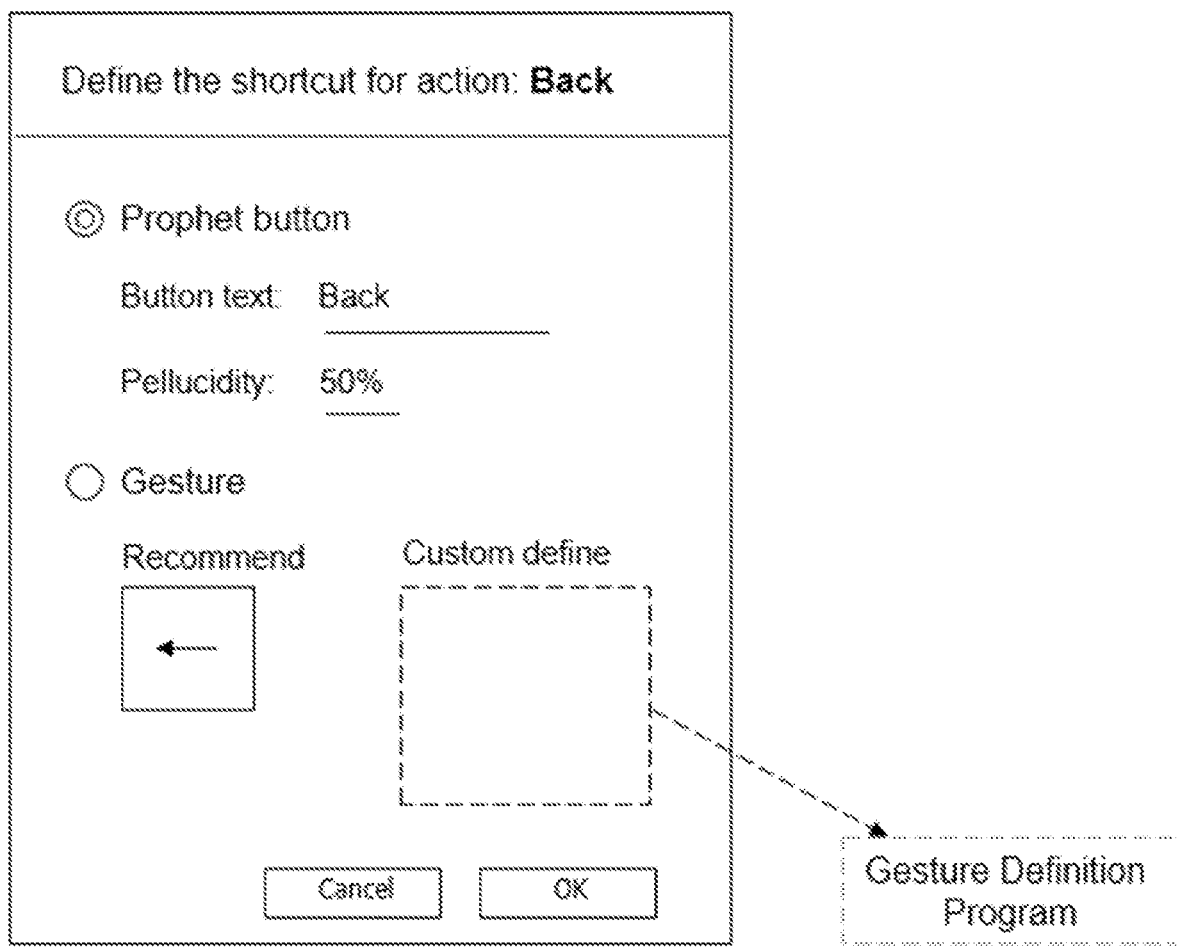
FIG. 10 depicts a diagram an example interface for creating a shortcut on a screen of a terminal device according to an embodiment of the present disclosure.

In some other embodiments, if the default shortcut cannot be retrieved, the computing device may provide an interface for creating the shortcut. When the user uses the interface to create the shortcut, the created shortcut may be provided on the screen. FIG. 10 shows an interface for creating the shortcut. For example, the shortcut button or the gesture icon may be created via the interface based on user input.

Figure 11:
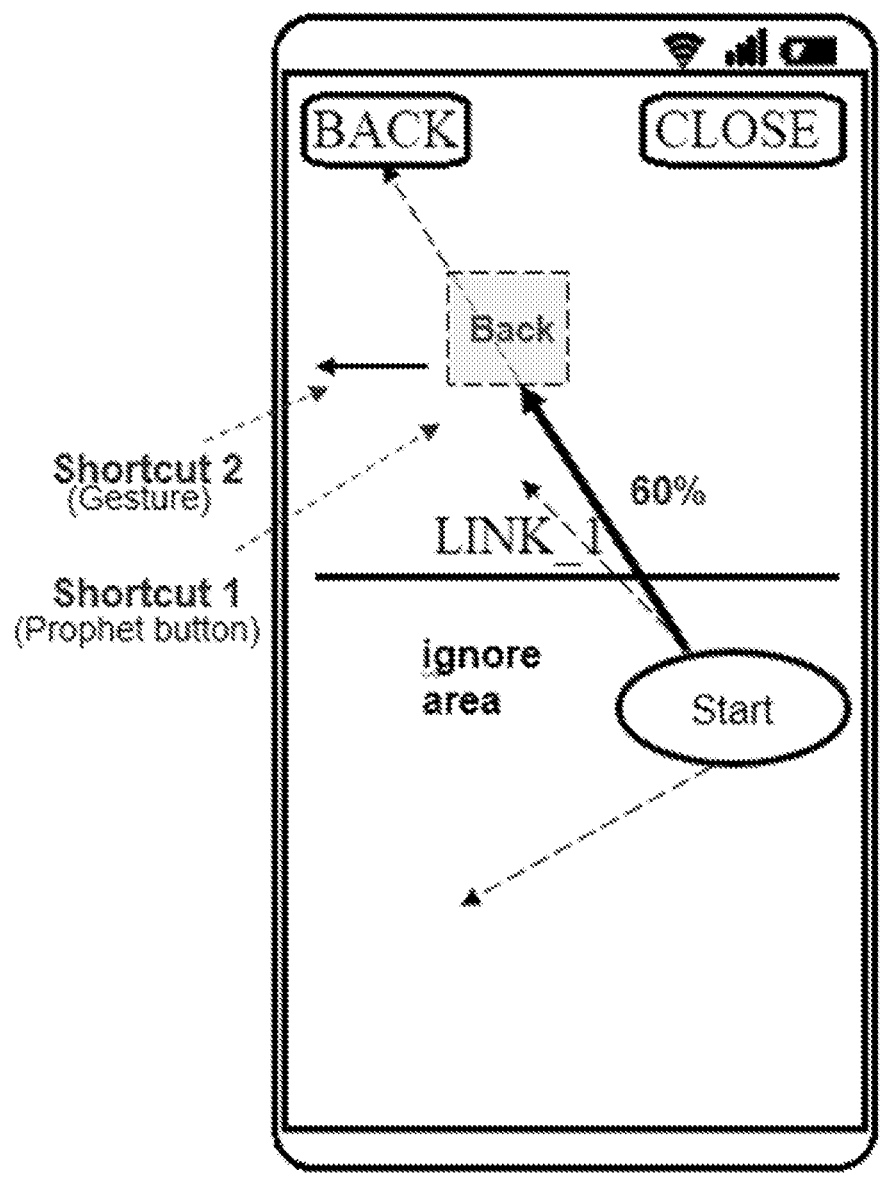
FIG. 11 depicts a diagram an example page displayed on a screen of a terminal device according to an embodiment of the present disclosure.

FIG. 11 depicts a diagram of a user interface on the terminal device, which is the same as the user interface in FIG. 5. In FIG. 11, a first shortcut (i.e., Prophet button) and a second shortcut 2 (Gesture) for the Back operation are presented based on the user input to the creation interface in FIG. 10. For example, the shortcut button may be provided along the route from the predetermined start position to the Back function element position. Additionally or alternatively, a gesture icon (←) may be presented on the user interface to prompt the user how to perform the operation by a gesture.

Accordingly, when the user touches the shortcut button or perform the corresponding gesture, the expected operation may be initiated directly without performing the whole uncomfortable operation.

Moreover, FIG. 11 schematically shows an ignore area. No shortcut will be generated for the function elements in the ignore area, as such function elements are easy to touch.

Figure 12:
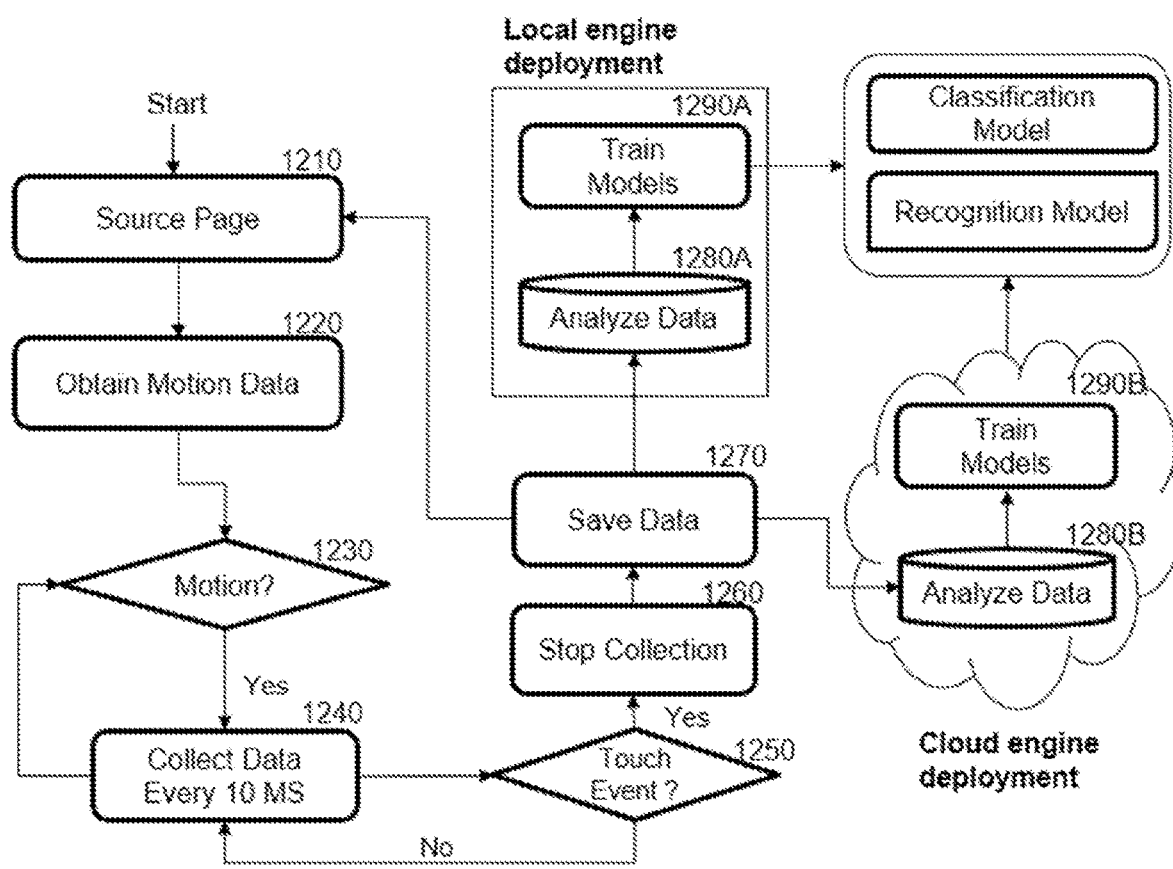
FIG. 12 depicts a schematic flowchart illustrating an example process for training a model according to an embodiment of the present disclosure.

FIG. 12 depicts a schematic flowchart illustrating an example process for training a model, such as a classification model or a recognition model, according to an embodiment of the present disclosure. This process could be implemented by a computing device, for example, the computer system/server 12 shown in FIG. 1. In this process, the method for classification model training in FIG. 4 and the method for recognition model training in FIG. 7 may be implemented, respectively.

At 1210, a source page may be opened on a terminal device. The computing device may identify an identification of the source page (or a user interface). At 1220, the computing device may check motion data of the terminal device from motion sensors. If the motion data indicate the terminal device has started shaking or rotating at 1230, the computing device may collect the motion data every 10 ms at 1240, until there is a touch event (i.e., an operation) detected on the terminal device at 1250. In responding to the touch event, the computing device may stop collecting the motion data at 1260. Then, the computing device may identify a function name of the touch event. Moreover, the computing device may associate the collected set of motion data with the identification of the source page and the function name of the touch event, and save them as a training subset at 1270.

The operations 1210-1270 may be iterated a large number of times, such that the resulting training subsets may be obtained. Further, the obtained training subsets may constitute a training set (for example, the first training set and/or the second training set as described above). In some embodiments, the iteration of operations 1210-1270 may be performed to implement the process of block 410 and the process of block 710, respectively.

Then, the computing device may send the training set to a local engine or a cloud engine to train the respective models. Alternatively, the models may also be trained by the same computing device performing the previous operations.

In an aspect, the engines may process and analyze the training set at 1280A, 1280B, respectively. For example, the operation 1280A (or 1280B) may be performed to implement the processes of block 420 and 430. Then, the engines may train the classification model based on the training set and the processed data at 1290A, 1290B, respectively. In some embodiments, the operation 1290A (or 1290B) may be performed to implement the process of block 440.

In another aspect, the engines may also train the recognition model at 1290A, 1290B, respectively. In some embodiments, the operation 1290A (or 1290B) may be performed to implement the process of block 720.

Figure 13:
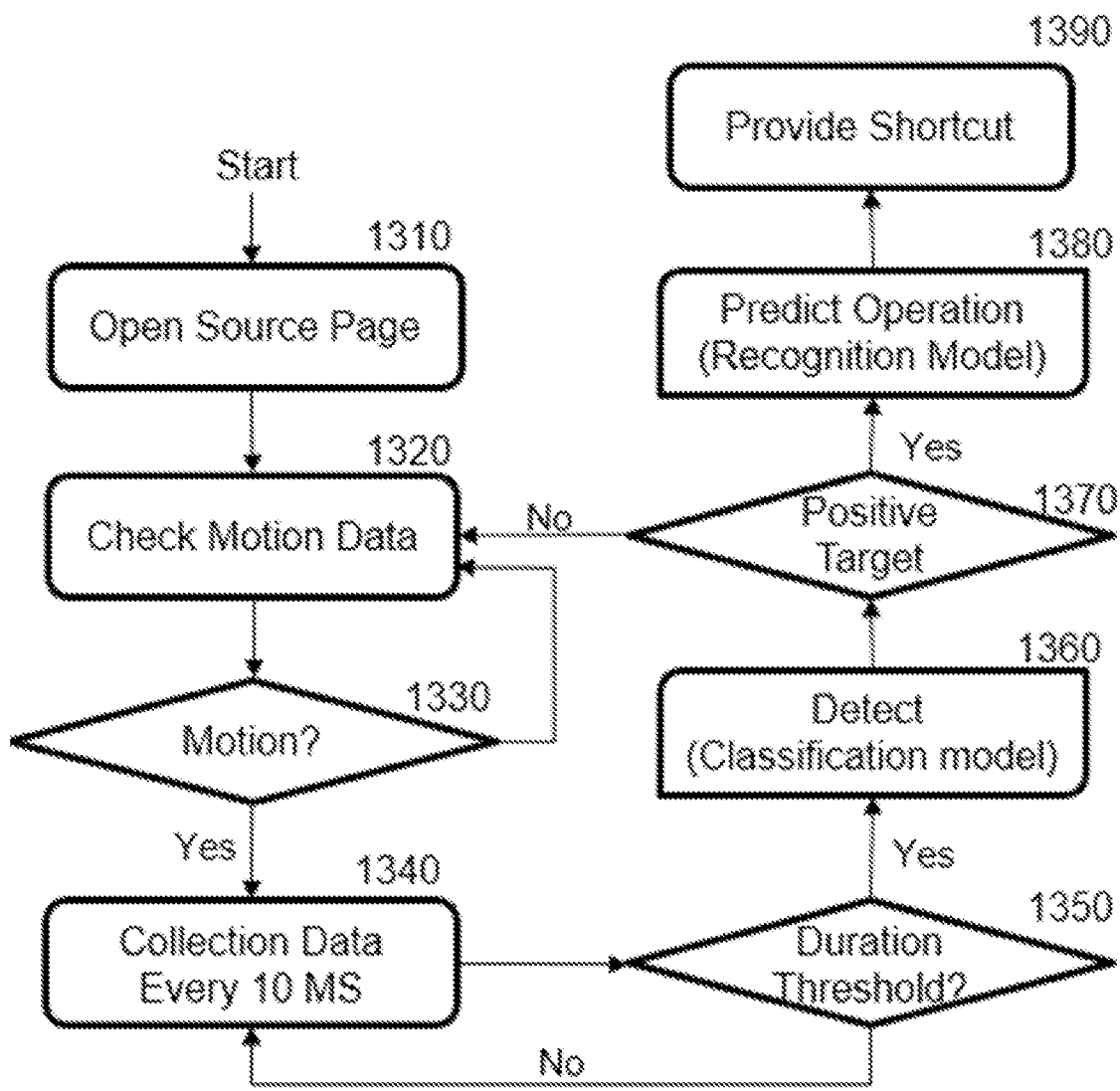
FIG. 13 depicts a schematic flowchart illustrating an example process for generating a shortcut according to an embodiment of the present disclosure.

FIG. 13 depicts a schematic flowchart illustrating an example process for generating a shortcut according to an embodiment of the present disclosure. This process could be implemented by a computing device, for example, the computer system/server 12 shown in FIG. 1. In this process, the method for generating a shortcut in FIG. 8 may be implemented.

In some embodiments, a user may open a source page and intend to perform an operation (for example, touch a function element) on the source page. At block 1310, the computing device may determine an identifier of the source page. Then, at block 1320, the computing device may check motion data of the terminal device, for example, through motion sensors. If the terminal device starts shaking or rotating at block 1330, the computing device may start collecting the motion data constantly or at a regular time interval, such as 10 ms, at block 1340.

After a duration threshold is expired at block 1350, the computing device may stop collecting the motion data. At block 1360, the computing device may determine whether the operation is a positive target or a negative target by way of the classification model trained according to the method in FIG. 4. If the operation is a positive target at block 1370, the computing device may further predict the operation by way of the recognition model at block 1380. Accordingly, the computing device may provide the shortcut on the source page. Otherwise, if the operation is determined as a negative target, the computing device may omit the obtained motion data and go back to block 1320 to repeat the above operations.

With this method, an alternative shortcut may be provided for the uncomfortable operations, thereby improving operation efficiency and achieving better user experiences.

Computer Readable Media and General Statements

It may be noted that sequences of the steps of methods described in the embodiments of the present disclosure are merely for illustrative purposes. Any other appropriate sequences (including addition, deletion, and/or modification of at least one step) can also be implemented to realize the corresponding embodiments.

Additionally, in some embodiments of the present disclosure, an apparatus for shortcut generation may be provided. The apparatus may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for shortcut generation may be provided. The computer program product may comprise a computer readable storage medium having program instructions embodied therewith. The program instructions executable by one or more processors causes the processor to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising, by a processor:
   obtaining motion data of a terminal device held by a user;
   predicting an operation of the user based on the motion data, the predicting comprising:
     determining the operation to be a positive target or a negative target, based on the motion data by way of a classification model, wherein:
       the positive target is determined based on the operation exceeding or being equal to a target uncomfortableness threshold;
       the negative target is determined based on the operation being less than the target uncomfortableness threshold; and
       the shortcut is provided for the operation determined to be the positive target; and
     in response to the operation being a positive target, predicting the operation based on the motion data using a recognition model; and
   providing a shortcut for the predicted operation.

2. The method of claim 1, wherein the classification model is trained by:
   obtaining a first training set for a plurality of operations, wherein the first training set comprises identifications of respective said operations and motion data of the terminal device associated with the respective operations;
   determining an operation level for each of the plurality of the operations, based on the first training set;
   classifying the plurality of operations into a first group of operations, each of which is a negative target with the operation level lower than a certain threshold, and a second group of operations, each of which is a positive target with the operation level equal to or higher than the certain threshold; and
   training the classification model with the first training set for the first group of operations and the first training set for the second group of operations.

3. The method of claim 2, further comprising:
   determining a first duration which is an average duration of the first group of operations.

4. The method of claim 3, wherein obtaining the motion data of the terminal device held by the user comprises:
   obtaining the motion data of the terminal device held by a user during the first duration after a start time of the obtaining.

5. The method of claim 3, further comprising:
   determining a second duration which is an average duration of the second group of operations.

6. The method of claim 5, wherein providing the shortcut for the predicted operation comprises:
   calculating a ratio of the first duration and the second duration;
   determining a position between a predetermined start position and a function position according to the predicted operation, based on the ratio; and
   providing the shortcut at the position.

7. The method of claim 1, wherein the recognition model is trained by:
   obtaining a second training set for a plurality of operations, wherein the second training set comprises identifications of the respective operations and motion data of the terminal device associated with the respective operations; and
   training the recognition model with the second training set.

8. The method of claim 1, wherein providing the shortcut for the predicted operation comprises:
   retrieving a default shortcut for the predicted operation;
   providing the default shortcut as the shortcut;
   in response to retrieving no default shortcut for the predicted operation, presenting an interface for creating the shortcut, and
   providing a created shortcut as the shortcut.

9. The method of claim 1, wherein the motion data is selected from the group consisting of: gravity data, orientation data, and motion duration data.

10. The method of claim 1, wherein:
    the classification model is a logistic regression model; and
    the recognition model is a neural network model.

11. The method of claim 1, wherein the shortcut is selected from the group consisting of: a shortcut button and a gesture icon.

12. An apparatus, comprising:
    one or more processors;
    a memory coupled to at least one of the one or more processors; and
    a set of computer program instructions stored in the memory and executed by at least one of the one or more processors in order to perform actions of:
      obtaining motion data of a terminal device held by a user;
      predicting an operation of the user based on the motion data, the predicting comprising:
        determining the operation to be a positive target or a negative target, based on the motion data by way of a classification model, wherein:
          the positive target is determined based on the operation exceeding or being equal to a target uncomfortableness threshold;
          the negative target is determined based on the operation being less than the target uncomfortableness threshold; and
          the shortcut is provided for the operation determined to be the positive target; and
        in response to the operation being a positive target, predicting the operation based on the motion data using a recognition model; and
      providing a shortcut for the predicted operation.

13. The apparatus of claim 12, wherein the classification model is trained by:
    obtaining a first training set for a plurality of operations, wherein the first training set comprises identifications of the respective operations and motion data of the terminal device associated with the respective operations;

determining an operation level for each of the plurality of operations, based on the first training set;

classifying the plurality of operations into a first group of operations, each of which is a negative target with the operation level lower than a certain threshold, and a second group of operations, each of which is a positive target with the operation level equal to or higher than the certain threshold; and training the classification model with the first training set for the first group of operations and the first training set for the second group of operations.

14. The apparatus of claim 12, wherein the recognition model is trained by:

obtaining a second training set comprising identifications of a plurality of operations and motion data of the terminal device associated with the plurality of operations; and training the recognition model with the second training set.

15. The apparatus of claim 12, the actions further comprise:

determining a first duration which is an average duration of the first group of operations.

16. The apparatus of claim 15, wherein obtaining the motion data of the terminal device held by a user comprises:

obtaining the motion data of the terminal device held by the user during the first duration after a start timepoint of the obtaining.

17. A computer-implemented method comprising, by a processor:

obtaining motion data of a terminal device held by a user;

predicting an operation of the user based on the motion data; and providing a shortcut for the predicted operation;

wherein predicting the operation of the user based on the motion data comprises:

determining the operation to be a positive target or a negative target, based on the motion data by way of a classification model, wherein the shortcut is provided for the operation determined to be the positive target; and in response to the operation being a positive target, predicting the operation based on the motion data using a recognition model;

wherein the classification model is trained by:

obtaining a first training set for a plurality of operations, wherein the first training set comprises identifications of respective said operations and motion data of the terminal device associated with the respective operations;

determining an operation level for each of the plurality of the operations, based on the first training set;

classifying the plurality of operations into a first group of operations, each of which is a negative target with the operation level lower than a certain threshold, and a second group of operations, each of which is a positive target with the operation level equal to or higher than the certain threshold; and training the classification model with the first training set for the first group of operations and the first training set for the second group of operations.

* * * * *